(12) United States Patent
Snyder

(10) Patent No.: US 12,516,816 B1
(45) Date of Patent: Jan. 6, 2026

(54) 3D DIFFUSER FED SCOOP FUEL INJECTOR

(71) Applicant: RTX Corporation, Farmington, CT (US)

(72) Inventor: Timothy Snyder, Glastonbury, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 19/080,358

(22) Filed: Mar. 14, 2025

(51) Int. Cl.
F23R 3/04 (2006.01)
F23R 3/16 (2006.01)
F23R 3/00 (2006.01)

(52) U.S. Cl.
CPC ............... F23R 3/16 (2013.01); F23R 3/045 (2013.01); F23R 3/002 (2013.01)

(58) Field of Classification Search
CPC ............ F23R 3/002; F23R 3/045; F23R 3/16
See application file for complete search history.

(56) References Cited

U.S. PATENT DOCUMENTS

| | | | |
|---|---|---|---|
| 2,841,958 A | 7/1958 | Stokes et al. | |
| 3,581,482 A | 6/1971 | Reber et al. | |
| 4,314,443 A | 2/1982 | Barbeau | |
| 4,967,562 A * | 11/1990 | Shekleton | F23R 3/28 60/738 |
| 6,931,862 B2 | 8/2005 | Harris | |
| 8,127,551 B2 | 3/2012 | Commaret et al. | |
| 11,136,901 B2 * | 10/2021 | Binek | F23R 3/54 |
| 11,421,883 B2 | 8/2022 | Binek et al. | |
| 11,649,964 B2 | 5/2023 | Binek et al. | |
| 11,754,287 B2 | 9/2023 | Binek et al. | |
| 11,846,421 B2 | 12/2023 | Binek et al. | |
| 11,959,401 B1 | 4/2024 | Nasir et al. | |
| 12,116,934 B2 | 10/2024 | Binek et al. | |
| 2020/0362724 A1 | 11/2020 | Binek et al. | |
| 2021/0254831 A1 * | 8/2021 | Binek | F23R 3/002 |
| 2024/0271568 A1 * | 8/2024 | Binek | F23R 3/283 |

* cited by examiner

Primary Examiner — William H Rodriguez
(74) Attorney, Agent, or Firm — Kinney & Lange, P.A.

(57) ABSTRACT

A combustor system for an aerial vehicle includes an diffuser case with a first and second end and a large and small radius section, an inner diffuser wall contained within the diffuser case, the inner diffuser wall with a lumen, a central combustor chamber, a first air flow path extending between the diffuser case and inner diffuser wall, an integrated air scoop attached to the inner diffuser wall at the first lumen that directs air from the first air flow path into the central combustor chamber, a fuel manifold and fuel orifice within the integrated air scoop, and a splash plate comprising with a first and second face. The splash plate extends through the lumen into the central combustor chamber. The large radius section is aligned with the inner diffuser wall away from the splash plate and the small radius section is aligned with the splash plate.

20 Claims, 10 Drawing Sheets

3D DIFFUSER FED SCOOP FUEL INJECTOR

BACKGROUND

A combustor section in a modern turbine engine includes one or more fuel injectors. Each fuel injector is operable to inject fuel for combustion within a combustion chamber. Air is mixed with fuel to facilitate combustion. Various types and configurations of fuel injectors and air flow paths are known in the art. While these known fuel injectors and air flow paths have various benefits, there is still room in the art for improvement. There is a need in the art, for example, for flow paths within a combustor liner to be improved.

SUMMARY

One example of a combustor system for an aerial vehicle includes an diffuser case with a first and second end and a large and small radius section, an inner diffuser wall contained within the diffuser case, the inner diffuser wall with a lumen and defining an outer periphery of a central combustor chamber, a first air flow path extending between and defined by the diffuser case and the inner diffuser wall, an integrated air scoop attached to the inner diffuser wall at the first lumen and configured to direct air from the first air flow path into the central combustor chamber, a fuel manifold with a fuel orifice within the integrated air scoop, and a splash plate comprising a first face and a second face, the splash plate extending through the first lumen into the central combustor chamber, wherein the large radius section is aligned with the inner diffuser wall away from the splash plate and the small radius section is aligned with the splash plate.

Another example of a combustor system for an aerial vehicle, the combustor system includes an diffuser case, the diffuser case having a first end and a second end, a large radius section and a small radius section, an inner diffuser wall contained within the diffuser case, the inner diffuser wall defining an outer periphery of a central combustor chamber, the inner diffuser wall having a plurality of lumens extending through the inner diffuser wall into the central combustor chamber, a first air flow path extending between and defined by the diffuser case and the inner diffuser wall and fluidly connected to the central combustor chamber by the plurality of lumens, a plurality of integrated air scoops, each respective integrated air scoop attached to the inner diffuser wall at each respective lumen and configured to direct air from the first air flow path into the central combustor chamber, a plurality of fuel manifolds with a plurality of fuel orifices within each respective integrated air scoop, and a plurality of splash plates comprising a first face and a second face, each respective splash plate extending through each respective lumen into the central combustor chamber, wherein the large radius section is aligned with the inner diffuser wall away from the plurality of splash plates and the small radius section is aligned with the plurality of splash plates.

The present summary is provided only by way of example, and not limitation. Other aspects of the present disclosure will be appreciated in view of the entirety of the present disclosure, including the entire text, claims, and accompanying figures.

Figure 1:
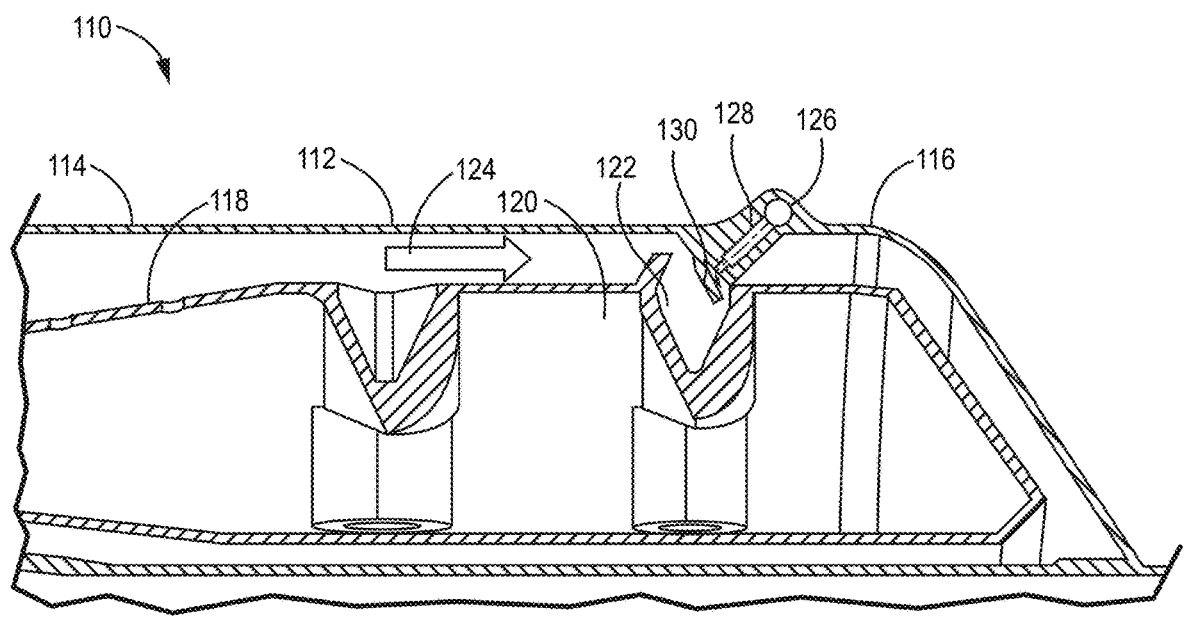
FIG. 1 is a schematic side sectional illustration of a conventional combustor for an aerial vehicle.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a combustor system for a gas turbine engine. In particular, this disclosure involves directing an oxygenating fluid into a central combustor chamber via an airflow path that includes an air scoops and splash plates.

FIG. 1 is a side sectional illustration of a conventional gas turbine engine combustor assembly 110 within an engine (not more broadly pictured). This engine can be located within an aerial vehicle such as, but not limited to, an unmanned aerial vehicle (UAV), a drone, or any other manned or unmanned aircraft or self-propelled projectile. This turbine engine is configured for propelling the aerial vehicle during flight.

Assembly 110 includes outer case 112 with first end 114 and second end 116, inner combustor case 118 defining central combustor chamber 120 with lumen 122, first air flow path 124, fuel manifold 126, fuel orifice 128, and splash plate 130.

In current combustor assemblies as shown in FIG. 1, outer case 112 has first end 114 and second end 116. Outer case 112 surrounds inner combustor case 118. Inner combustor case defines central combustor chamber 120, with lumen 122 connecting inner combustor chamber 120 to first air flow path 124. Air flow path 124 is between outer case 112 and inner combustor case 118. Air flows from first end 114 of outer case 112 towards second end 116 before being directed through into central combustor chamber 120 through lumen 122. Fuel manifold 126 is part of outer case 112 and directs fuel from manifold 126 through fuel orifice 128 onto splash plate 130. Fuel mixes with air from air flow path 124 inside lumen 122 before entering central combustor chamber 120. In FIG. 1, air flows from first end 114 to second end before being directed into central combustor chamber 120, where flow direction flips from second end 116 to first end 114.

Figure 2A:
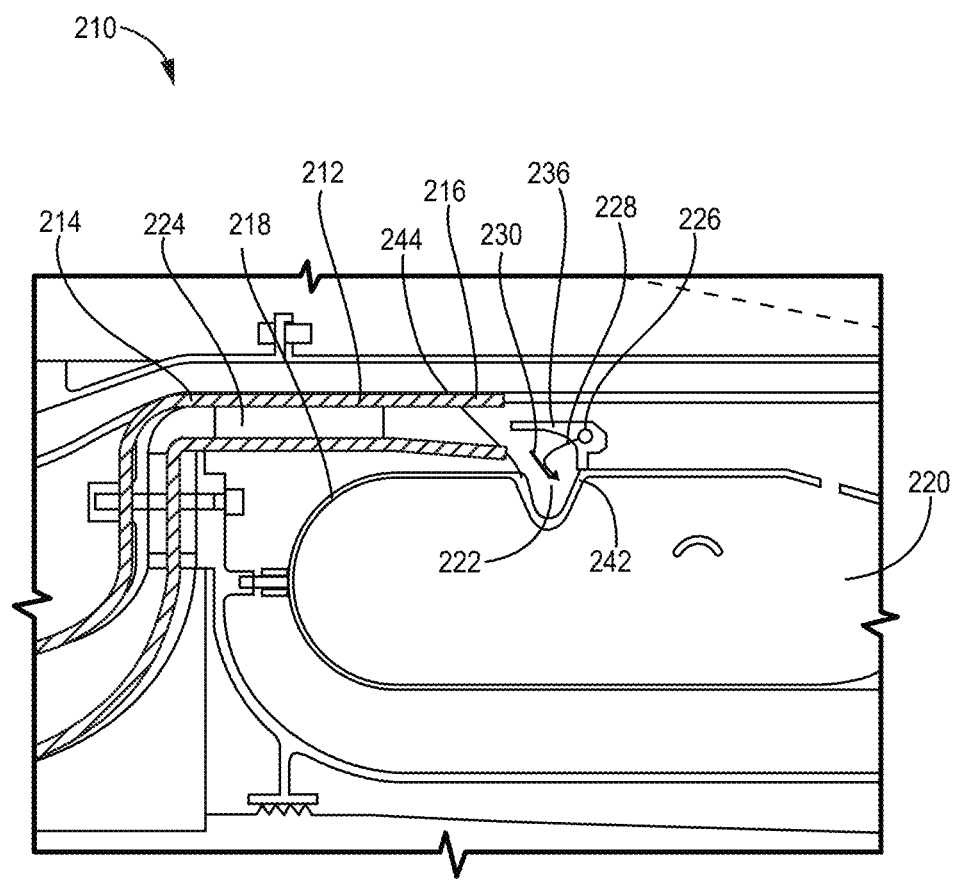
FIG. 2A is a schematic cross-sectional view of a first embodiment of a combustor with an integrated air scoop.
Figure 2B:
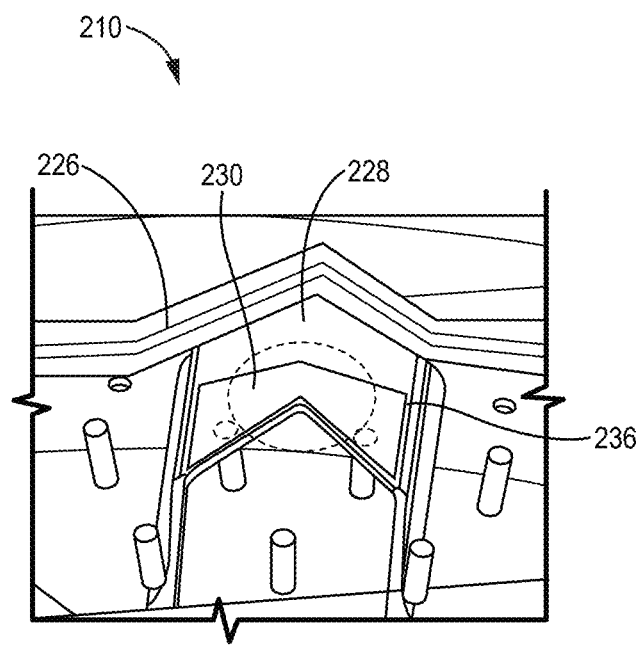
FIG. 2B is a schematic perspective view of a portion of a second embodiment of a combustor with an integrated scoop and fuel manifold.
Figure 2C:
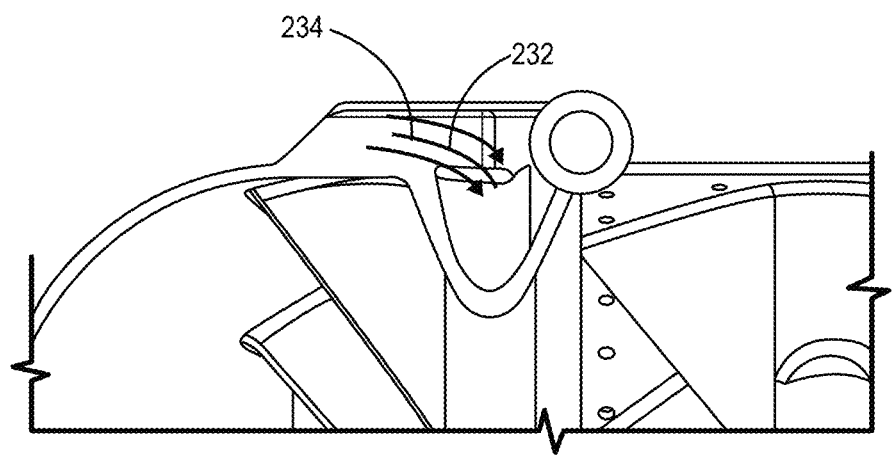
FIG. 2C is a cross-sectional view of a portion of the second embodiment of a combustor with an integrated scoop and fuel manifold.
Figure 3A:
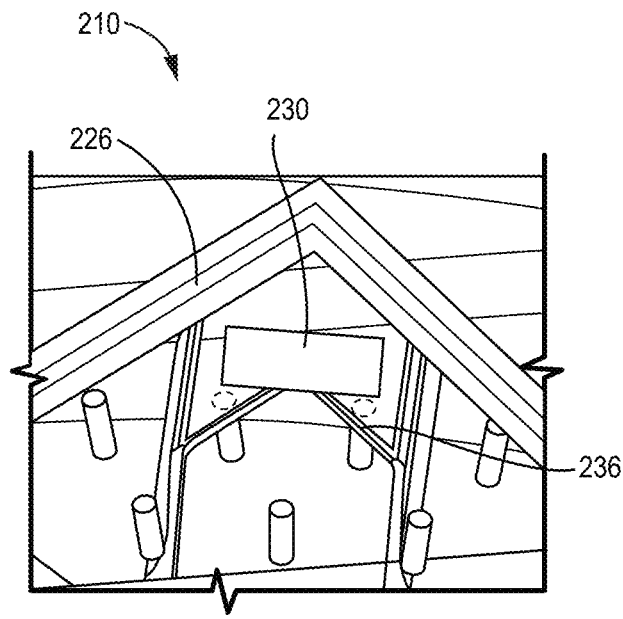
FIG. 3A is a schematic perspective view of a portion of a third embodiment of a combustor with a canted scoop and fuel manifold.
Figure 3B:
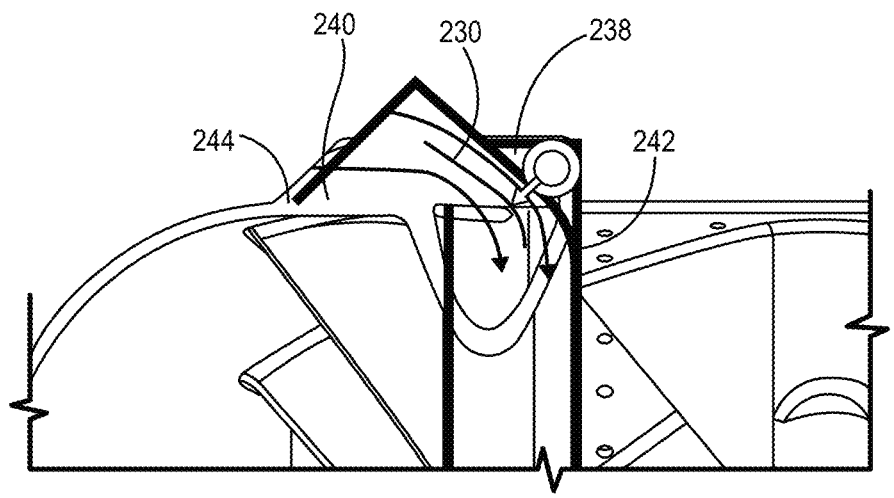
FIG. 3B is a cross-sectional view of a portion of the third embodiment of a combustor with a canted scoop and fuel manifold.
Figure 3C:
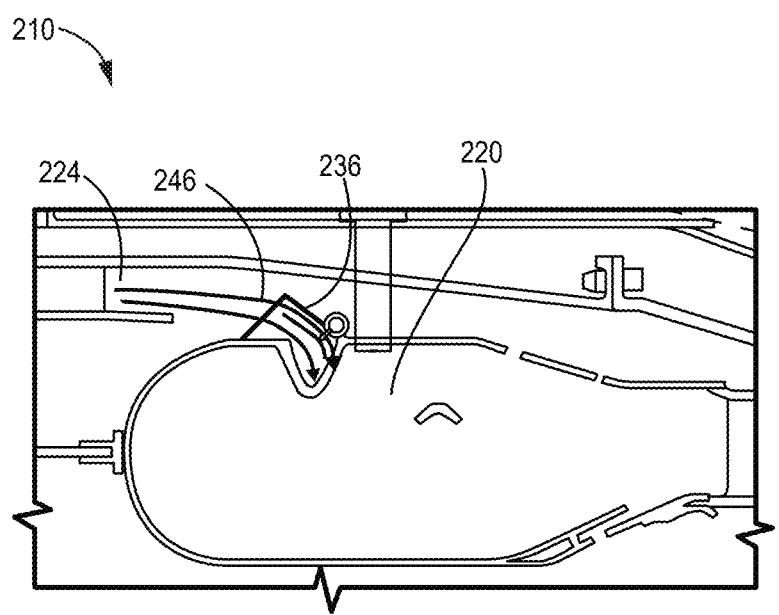
FIG. 3C is a schematic cross-sectional view of the third embodiment of a combustor with a canted scoop.

FIG. 2A is a schematic cross-sectional view of a first embodiment of a combustor with an integrated air scoop. FIGS. 2B and 2C are schematic perspective and cross-sectional views, respectively, of a portion of a second embodiment of a combustor with an integrated scoop and fuel manifold. FIGS. 3A and 3B is an illustration of a portion of a third embodiment of a combustor with a canted scoop and fuel manifold. FIG. 3B is a cross-sectional view of a portion of the third embodiment of a combustor liner with a canted scoop and fuel manifold. FIG. 3C is a schematic cross-sectional view of the third embodiment of a combustor liner with a canted scoop. FIGS. 2A-3C will be discussed together.

FIGS. 2A-3C show gas turbine engine combustor assembly 210, and illustrate many of the same functional elements in different arrangement and/or geometries. Assembly 210 includes outer case 212 with first end 214 and second end 216, inner combustor case 218 defining central combustor chamber 220 with lumen 222, first air flow path 224, fuel manifold 226, fuel orifice 228, and splash plate 230 with first face 232 and second face 234. Assembly 210 further includes integrated air scoop 236 with first end 238 and second end 240. Lumen 222 further includes first lip 242 and second lip 244 (shown in FIG. 3B).

Air flow enters at first end 214 before flowing towards second end 216. In the embodiment of FIGS. 2A-3C, first end 214 is a diffuser inlet and second end 216 is a diffuser exit. Air flow can be a standard air mixture or have higher oxygen content. Inner combustor case 218 defines central combustor chamber 220, with lumen 222 linking central combustor chamber 220 and air flow path 224. Integrated air scoop 236 directs air flow from air flow path 224 through lumen 222 into central combustor chamber 220. Due to fluid dynamics, as airflow enters first end 214, fluid flow will concentrate towards outer case 212. Scoop 236 overcomes these fluidic forces to direct more airflow into central combustor chamber 220. Scoop 236 can be attached to inner combustor case 218 at first lip 242. Fluid manifold 226 is integrated within scoop 236, and directs fuel through scoop 236 out of fuel orifice 228 onto splash plate 230. Splash plate 230 has first face 232 facing scoop 236, and second face 234 facing lumen 222 (faces 232, 234 shown in FIG. 2C). It is contemplated that fuel from fuel orifice 228 can direct fuel perpendicular to first face 232 to provide a fuel film on splash plate 230 which is then mixed with the air and atomizes at the end of the splash plate. In some embodiments (pictured in FIG. 2A) splash plate 230 is straight and extends from within air flow path 224 through lumen 222 into central combustor chamber 220. Splash plate 230 as pictured in FIG. 2A is entering enclosed under scoop 236. In other embodiments (shown in FIG. 2C) splash plate 236 may be curved and start substantially parallel to flow path 224 before bending through lumen 222 and into central combustor chamber 220. Splash plate 236 as pictured in FIG. 2C also extends into air flow path 224 beyond first end 238 (shown in FIG. 3B) of scoop 236. By extending into air flow path 224, splash plate 236 helps to turn fluid flow from air flow path 224 into central combustor chamber 220. Fluid passes on both first face 232 of splash plate 236 where fuel from fuel orifice 228 mixes with fluid, and on second face 234 of splash plate. After fluid travels along the length of splash plate 230, unmixed fluid from second face 234 can mix with partially mixed fluid from first face 232 to result in stronger mixing before entering central combustor chamber 220.

In other embodiments (shown in FIGS. 3A and 3B) integrated air scoop 236 can be a canted scoop. Scoop 236 as pictured in FIG. 3B includes a first end 238 and second end 240. First end 238 attaches to inner combustor case 218 at first lip 242, and second end 240 (shown in FIG. 3B) attaches at second lip 244. Scoop entrances 246 allows fluid to flow from flow path 224 into scoop 236 and over splash plate 230.

It is contemplated that the assembly as discussed above may be spaced circumferentially around an axis, with a plurality of scoops and lumens into central combustor chamber. This is discussed in more detail in FIG. 5 below.

The proposed configurations as disclosed above will allow inner combustor case 218 to slide from second end 216 of outer case 212 to first end 214, while still allowing improved air flow into central combustor chamber 220. A small combustor is required to fit between different engine components, such as a centrifugal compressor and axial turbine (not pictured). Airflow on both sides of splash plate 236 help to shear the fuel off first face 238 of splash plate 236. This design reduces air pressure losses, improves fuel/air mixing, and feeds the combustor with bulk swirl for improved combustion efficiency with lower smoke. Additionally, this design allows additively manufactured components that have tighter clearances, resulting in higher efficiency. The geometries and features of the various embodiments illustrated in FIGS. 2A-3B and discussed above can be mixed and/or combined in any functional manner.

Figure 4:
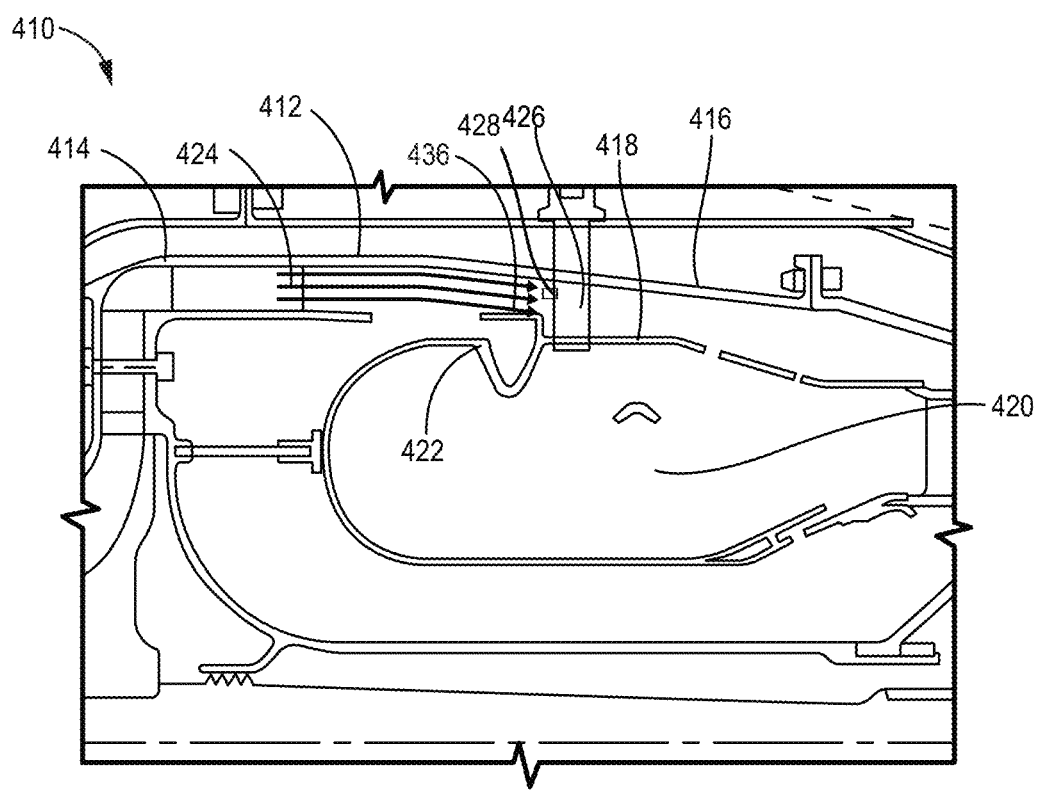
FIG. 4 is a schematic side sectional illustration of a combustor for an aerial vehicle, with a canted outer case.
Figure 5:
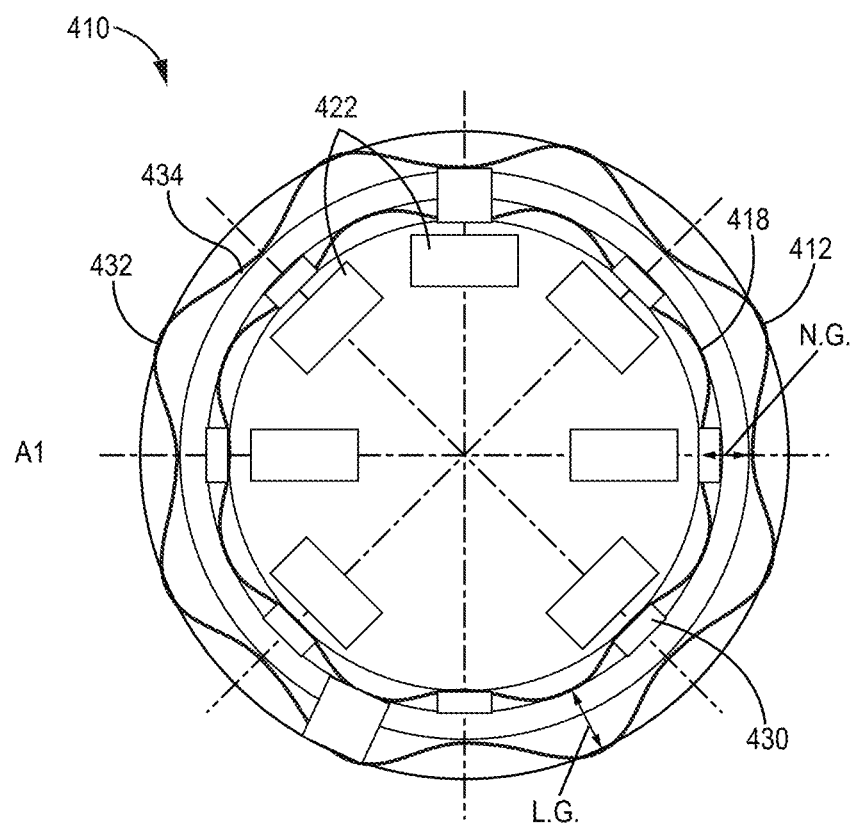
FIG. 5 is a cross-sectional view of a combustor with 3D diffuser scoops.

FIG. 4 is a schematic side sectional illustration of a combustor liner for an aerial vehicle, with a canted outer shell. FIG. 5 is a cross-sectional view of an annular diffuser with scalloped features. FIGS. 4 and 5 will be discussed together.

Assembly 410 includes diffuser case 412 with first end 414 and second end 416 (shown in FIG. 4) inner diffuser wall 418, central combustor chamber 420 with lumen 422, first air flow path 424, fuel manifold 426, and splash plate 430. Diffuser case 412 further includes large radius section 432 and small radius section 434. Assembly 410 further includes scoop 436.

As discussed above in regards to FIGS. 2A-3C, due to fluid dynamics, as airflow enters first end 414, fluid flow will concentrate towards diffuser case 412. In the pictured embodiment first end 414 and second end 416 are a diffuser inlet and diffuser exit respectively. To direct flow through lumen 422 into central combustor chamber 420, diffuser case 412 can have large diameter section 432 when not aligned with scoop 436, and have a smaller diameter section 434 when aligned with scoop. This results in a larger air flow path 424 between diffuser case 412 and inner diffuser wall 418 when not aligned with scoop 436, and a narrower combustor shell 438 when aligned with scoop 436. This is best pictured in FIG. 5, where the gap between inner diffuser wall 418 and diffuser case 412 is larger (labelled L.G. in FIG. 5) when outer diffuser wall is in a large diameter section 432, and the gap is narrower (labelled N.G. in FIG. 5) when in a small diameter section 434. The narrower flow path N.G. turns the flow into the scoops 430. Lumens 422 may be smaller than scoops 430. In an ideal embodiment, lumens 422 will extend further parallel to an axis aligned with a scoop than perpendicular to an axis, as shown along Axis A1 shown in FIG. 5.

It is contemplated that scoops 430 as disclosed in FIGS. 4-5 can be canted or fuel integrated as discussed with regards to FIGS. 2A-3C. Additionally, any of the splash plate configurations discussed above may be used in conjunction with the 3D annular diffuser as described.

Figure 6A:
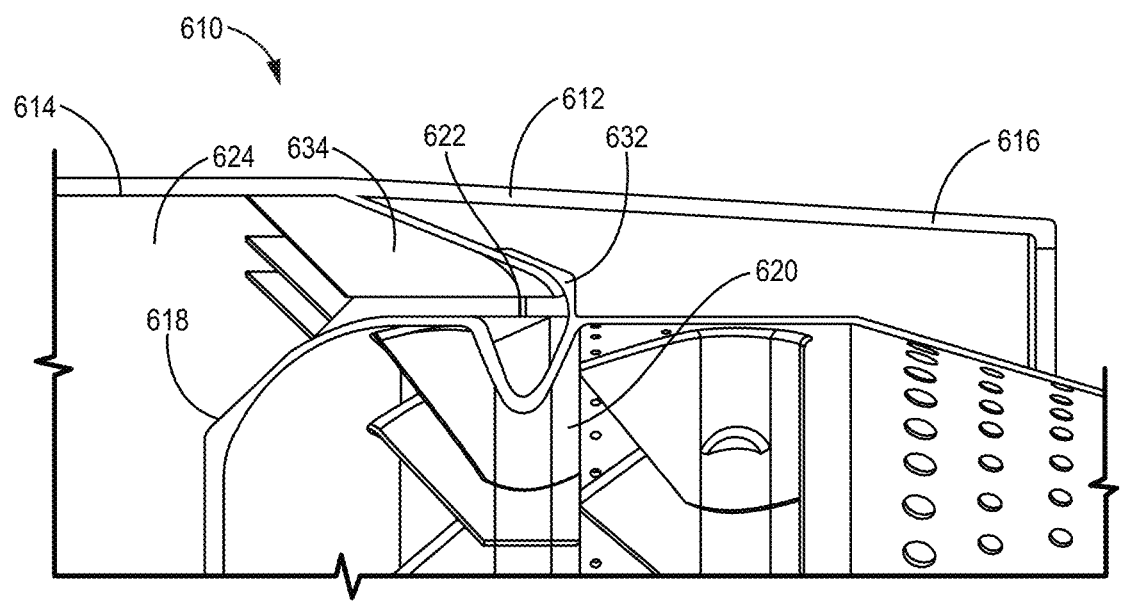
FIG. 6A is a cross-sectional view of an outer combustor case and inner combustor case with integrated flow scoops.
Figure 6B:
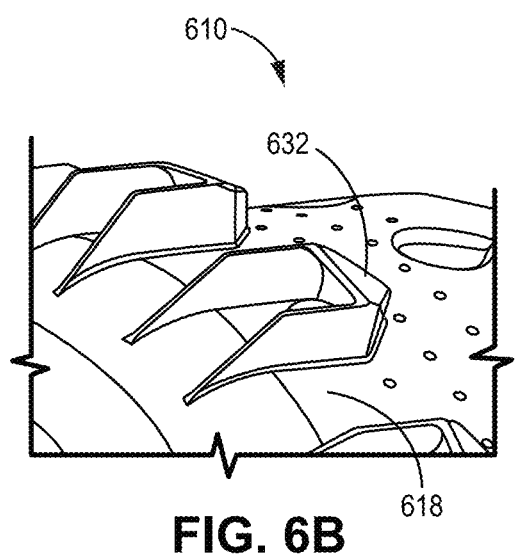
FIG. 6B is an angled perspective view of an outer case with an outer integrated flow scoop.
Figure 6C:
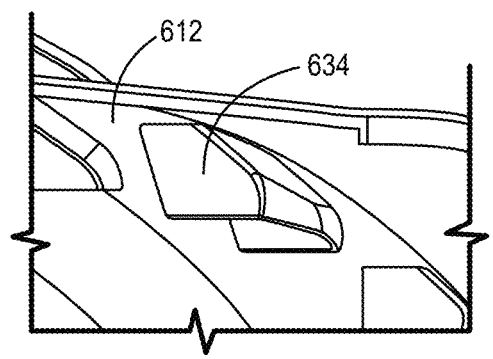
FIG. 6C is an axially-aligned perspective view of an inner combustor case with an inner integrated flow scoop.

FIG. 6A is a cross-sectional view of an outer case and inner combustor case with integrated flow scoops. FIG. 6B is a perspective view of an outer case with an outer integrated flow scoop. FIG. 6C is a perspective view of an inner combustor case with an inner integrated flow scoop. FIGS. 6A-C will be discussed together.

Assembly 610 includes outer case 612 with first end 614 and second end 616, inner combustor case 618 defining central combustor chamber 620 with lumen 622, first air flow path 624, fuel manifold 626, fuel orifice 628, and splash plate 630. Assembly 610 further includes first scoop 632 attached to inner combustor shell 618 and second scoop 634 attached to outer case 612.

FIG. 6A shows first scoop 632 and second scoop 634 fit together with a contact seal. FIG. 6B shows first scoop 632 detached from second scoop 634. FIG. 6C shows second scoop 634 detached from first scoop 632.

Outer case 612 and inner combustor case 618 define air flow path 624. The seal fit of first scoop 632 and second scoop 634 direct air flow from flow path 624 from first end 614 of outer case 612 into central combustor chamber 620 through lumen 622, with limited air flow from air flow path 624 reaching second end 616 of outer case 612 and passing through shell dilution holes (not pictured).

First scoop 632 can be fluidically connected to a fuel manifold, with a fuel orifice to direct fuel onto splash plate (fuel manifold and fuel orifice not pictured). Both first scoop 632 and second scoop 634 are arranged to be self-supporting for PBF-L additive producibility and require no additional mechanical post processing.

In some embodiments, outer case 612 contains an orbital array of second scoops that protrude from the outer case inwards towards the inner combustor case. The plurality of second scoops can be configured to be built additively and without the need of support structure and benefit from constant wall thickness mitigating a propensity for distortion. This same additive process may be used on the first scoops attached to the inner combustor case. The first and second scoops maximize the flow into the central combustor chamber, and do not obstruct overall combustor assembly. The first scoop height is governed by the outer case aft interface flange for assembly (not pictured).

This configuration supports combustor performance. It is important to direct an appreciable amount of flow from diffuser outlet (not pictured) into the central combustor chamber. Without the second scoops, and relying solely on the first scoops, the aft interface would prohibit assembly of the combustor into the outer case. Since the outer case and the combustor are produced additively, the introduction of scoops poses no significant impact on part cost.

Figure 7:
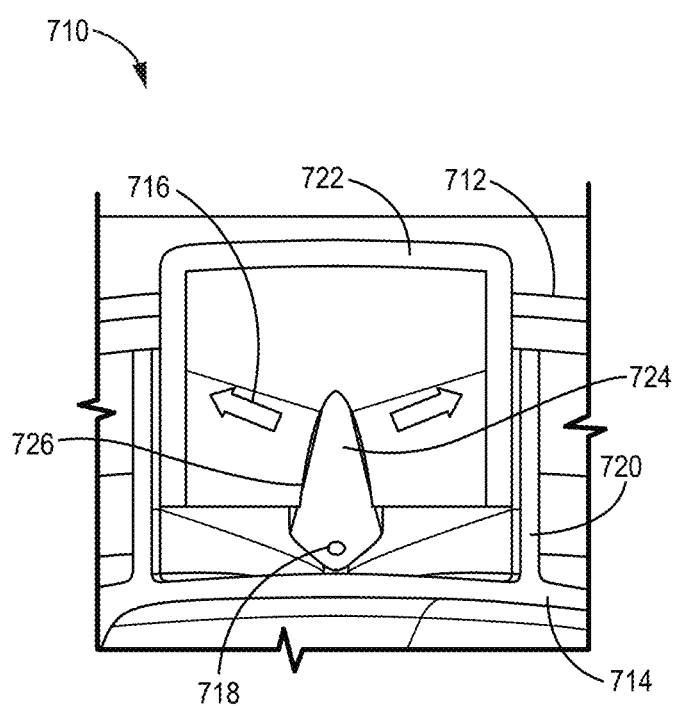
FIG. 7 is a cross-sectional view of an outer case and inner combustor case with interlocked flow scoops.

FIG. 7 is a cross-sectional view of an outer case and inner combustor case with interlocked flow scoops.

Assembly 710 includes outer case 712, inner combustor case 714, first air flow path 716, and fuel orifice 718. Assembly 610 further includes first scoop 720 attached to inner combustor case 714 and second scoop 722 attached to outer case 712. First scoop 720 includes wedge 724 and second scoop 722 includes bifurcated orifice 726.

Outer case 712 and inner combustor case 714 define air flow path 716. First scoop 720 and second scoop 722 interlock using wedge 724 and bifurcated orifice 726. Air from air flow path 716 is directed into a central combustor chamber (not pictured). Fuel from fuel orifice 718 is directed into central combustor chamber and is integrated into wedge 724.

As such, when the parts of assembly 710 are assembled, the wedge 724 forces the second scoop 722 to deflect along bifurcated orifice 726, pushing against the walls of the first scoop 720 thereby providing a degree of sealing. The wedge feature also allows for fuel delivery from a unitized fuel manifold (not pictured) without any additional mechanical post-processing.

Discussion of Possible Embodiments

The following are non-exclusive descriptions of possible embodiments of the present invention.

One embodiment of a combustor system for an aerial vehicle includes an diffuser case with a first and second end and a large and small radius section, an inner diffuser wall contained within the diffuser case, the inner diffuser wall with a lumen and defining an outer periphery of a central combustor chamber, a first air flow path extending between and defined by the diffuser case and the inner diffuser wall, an integrated air scoop attached to the inner diffuser wall at the first lumen and configured to direct air from the first air flow path into the central combustor chamber, a fuel manifold with a fuel orifice within the integrated air scoop, and a splash plate comprising a first face and a second face, the splash plate extending through the first lumen into the central combustor chamber, wherein the large radius section is aligned with the inner diffuser wall away from the splash plate and the small radius section is aligned with the splash plate.

The assembly of the preceding paragraph can optionally include, additionally and/or alternatively, any one or more of the following features, configurations and/or additional components:

The splash plate can be connected to the integrated air scoop.

The splash plate can be curved and configured to direct air flow into the central combustor chamber.

The splash plate can extend from within the first air flow path, through the first lumen, and into the central combustor chamber.

The integrated air scoop can be canted and further include a first end of the integrated air scoop connected to the inner diffuser wall on a first lip of the first lumen and a second end of the integrated air scoop connected to the inner diffuser wall on a second lip of the first lumen.

The splash plate can be parallel to the second end of the integrated air scoop.

The fuel orifice can be configured to direct fuel perpendicular to the second face of the splash plate.

The fuel orifice can be configured to direct fuel perpendicular to the second face of the splash plate.

The splash plate can be spaced between a lip of the first lumen and an inner face of the integrated air scoop such that air from the first air flow path is split on the first face and the second face of the splash plate.

The splash plate can extend from within the first air flow path, through the first lumen, and into the central combustor chamber.

The fuel orifice can be located on an inner face of the integrated air scoop.

The air flow within the first air flow path can comprise oxygen.

The splash plate can be connected to a support member, the support member connected to the integrated air scoop.

Another embodiment of a combustor system for an aerial vehicle, the combustor system includes an diffuser case, the diffuser case having a first end and a second end, a large radius section and a small radius section, an inner diffuser wall contained within the diffuser case, the inner diffuser wall defining an outer periphery of a central combustor chamber, the inner diffuser wall having a plurality of lumens extending through the inner diffuser wall into the central combustor chamber, a first air flow path extending between and defined by the diffuser case and the inner diffuser wall and fluidly connected to the central combustor chamber by the plurality of lumens, a plurality of integrated air scoops, each respective integrated air scoop attached to the inner diffuser wall at each respective lumen and configured to direct air from the first air flow path into the central combustor chamber, a plurality of fuel manifolds with a plurality of fuel orifices within each respective integrated air scoop, and a plurality of splash plates comprising a first face and a second face, each respective splash plate extending through each respective lumen into the central combustor chamber, wherein the large radius section is aligned with the inner diffuser wall away from the plurality of splash plates and the small radius section is aligned with the plurality of splash plates.

The assembly of the preceding paragraph can optionally include, additionally and/or alternatively, any one or more of the following features, configurations and/or additional components:

Each respective splash plate can be connected to the respective integrated air scoop.

At least one of the plurality of splash plates can be curved and configured to direct air flow into the central combustor chamber.

At least one of the plurality of splash plates can extend from within the first air flow path, through the respective lumen, and into the central combustor chamber.

At least one integrated air scoop can be canted with a first end of the integrated air scoop connected to the inner diffuser wall on a first lip of the respective lumen, and a second end of the integrated air scoop connected to the inner diffuser wall on a second lip of the respective lumen.

At least one of the plurality of splash plates can be parallel to the second end of the integrated air scoop.

At least one of the plurality of fuel orifices can be configured to direct fuel perpendicular to the second face at least one splash plate.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor system for an aerial vehicle, the combustor system comprising:
   an diffuser case, the diffuser case having a first end and a second end, a large radius section and a small radius section;
   an inner diffuser wall contained within the diffuser case, the inner diffuser wall defining an outer periphery of a central combustor chamber, the inner diffuser wall having a first lumen into the central combustor chamber;
   a first air flow path extending between and defined by the diffuser case and the inner diffuser wall;
   an integrated air scoop attached to the inner diffuser wall at the first lumen and configured to direct air from the first air flow path into the central combustor chamber;
   a fuel manifold with a fuel orifice within the integrated air scoop; and
   a splash plate comprising a first face and a second face, the splash plate extending through the first lumen into the central combustor chamber, wherein the large radius section is aligned with the inner diffuser wall away from the splash plate and the small radius section is aligned with the splash plate.

2. The combustor system of claim 1, wherein the splash plate is connected to the integrated air scoop.

3. The combustor system of claim 1, wherein the splash plate is curved and configured to direct air flow into the central combustor chamber.

4. The combustor system of claim 3, wherein the splash plate extends from within the first air flow path, through the first lumen, and into the central combustor chamber.

5. The combustor system of claim 4, wherein the integrated air scoop is canted and further comprises:
   a first end of the integrated air scoop connected to the inner diffuser wall on a first lip of the first lumen; and
   a second end of the integrated air scoop connected to the inner diffuser wall on a second lip of the first lumen.

6. The combustor system of claim 5, wherein the splash plate is parallel to the second end of the integrated air scoop.

7. The combustor system of claim 6, wherein the fuel orifice is configured to direct fuel perpendicular to the second face of the splash plate.

8. The combustor system of claim 1, wherein the fuel orifice is configured to direct fuel perpendicular to the second face of the splash plate.

9. The combustor system of claim 1, wherein the splash plate is spaced between a lip of the first lumen and an inner face of the integrated air scoop such that air from the first air flow path is split on the first face and the second face of the splash plate.

10. The combustor system of claim 1, wherein the splash plate extends from within the first air flow path, through the first lumen, and into the central combustor chamber.

11. The combustor system of claim 1, wherein the fuel orifice is located on an inner face of the integrated air scoop.

12. The combustor system of claim 1, wherein the air flow within the first air flow path comprises oxygen.

13. The combustor system of claim 1, wherein the splash plate is connected to a support member, the support member connected to the integrated air scoop.

14. A combustor system for an aerial vehicle, the combustor system comprising:
   an diffuser case, the diffuser case having a first end and a second end, a large radius section and a small radius section;
   an inner diffuser wall contained within the diffuser case, the inner diffuser wall defining an outer periphery of a central combustor chamber, the inner diffuser wall having a plurality of lumens extending through the inner diffuser wall into the central combustor chamber;

a first air flow path extending between and defined by the diffuser case and the inner diffuser wall and fluidly connected to the central combustor chamber by the plurality of lumens;

a plurality of integrated air scoops, each respective integrated air scoop attached to the inner diffuser wall at each respective lumen and configured to direct air from the first air flow path into the central combustor chamber;

a plurality of fuel manifolds with a plurality of fuel orifices within each respective integrated air scoop; and a plurality of splash plates comprising a first face and a second face, each respective splash plate extending through each respective lumen into the central combustor chamber, wherein the large radius section is aligned with the inner diffuser wall away from the plurality of splash plates and the small radius section is aligned with the plurality of splash plates.

15. The combustor system of claim 14, wherein each respective splash plate is connected to the respective integrated air scoop.

16. The combustor system of claim 14, wherein at least one of the plurality of splash plates is curved and configured to direct air flow into the central combustor chamber.

17. The combustor system of claim 16, wherein at least one of the plurality of splash plates extends from within the first air flow path, through the respective lumen, and into the central combustor chamber.

18. The combustor system of claim 17, wherein at least one integrated air scoop is canted with a first end of the integrated air scoop connected to the inner diffuser wall on a first lip of the respective lumen, and a second end of the integrated air scoop connected to the inner diffuser wall on a second lip of the respective lumen.

19. The combustor system of claim 18, wherein at least one of the plurality of splash plates is parallel to the second end of the integrated air scoop.

20. The combustor system of claim 19, wherein at least one of the plurality of fuel orifices is configured to direct fuel perpendicular to the second face at least one splash plate.

* * * * *